(12) United States Patent
Bronshtein

(10) Patent No.: US 9,292,936 B2
(45) Date of Patent: Mar. 22, 2016

(54) METHOD AND APPARATUS FOR DETERMINING LOCATION

(71) Applicant: OMIIMII LTD., Tel Aviv (IL)

(72) Inventor: Gonen Bronshtein, Tel Aviv (IL)

(73) Assignee: OMIIMII LTD., Tel Aviv (IL)

( * ) Notice: Subject to any disclaimer, the term of this patent is extended or adjusted under 35 U.S.C. 154(b) by 142 days.

(21) Appl. No.: 14/149,971

(22) Filed: Jan. 8, 2014

(65) Prior Publication Data

US 2014/0193040 A1 Jul. 10, 2014

Related U.S. Application Data

(60) Provisional application No. 61/750,478, filed on Jan. 9, 2013.

(51) Int. Cl.
*G06K 9/00* (2006.01)
*G06T 7/20* (2006.01)

(52) U.S. Cl.
CPC ..... *G06T 7/2033* (2013.01); *G06T 2207/10016* (2013.01); *G06T 2207/30232* (2013.01); *G06T 2207/30241* (2013.01); *G06T 2207/30244* (2013.01)

(58) Field of Classification Search
CPC . G06K 9/00771; G06K 9/62; G06K 7/10475; G06K 9/00335; G06K 2017/0045; G06K 7/0095; G06T 2207/30232; G06T 7/20; G06T 2207/30241
USPC ......................................................... 382/107
See application file for complete search history.

(56) References Cited

U.S. PATENT DOCUMENTS

| 6,415,223 B1* | 7/2002 | Lin ........................ G01C 21/20 340/988 |
| 7,460,064 B1* | 12/2008 | Tester ..................... G01S 19/13 342/357.51 |
| 2008/0045848 A1* | 2/2008 | Lacombe ............... G01F 1/7086 600/505 |
| 2009/0267921 A1* | 10/2009 | Pryor ..................... B60K 35/00 345/177 |
| 2010/0278379 A1 | 11/2010 | Rothschild |
| 2011/0148922 A1 | 6/2011 | Son et al. |
| 2011/0255739 A1* | 10/2011 | Lee ........................ G01S 3/7864 382/103 |
| 2011/0258075 A1* | 10/2011 | Ciurea ................... G06Q 20/20 705/26.41 |
| 2011/0285620 A1* | 11/2011 | Latta ....................... G06F 3/017 345/156 |
| 2012/0148102 A1* | 6/2012 | Moriguchi .............. G06T 7/208 382/103 |
| 2012/0158297 A1* | 6/2012 | Kim ....................... G01C 21/206 701/516 |
| 2012/0214507 A1* | 8/2012 | Vartanian ................ G01S 15/08 455/456.1 |
| 2012/0321133 A1* | 12/2012 | Rous ........................ G06T 7/20 382/103 |

(Continued)

FOREIGN PATENT DOCUMENTS

| WO | 2012024516 A2 | 2/2012 |
| WO | WO 2013/080809 * | 6/2013 |
| WO | 2013108043 A2 | 7/2013 |

*Primary Examiner* — Stephen R Koziol
*Assistant Examiner* — Shaghayegh Azima
(74) *Attorney, Agent, or Firm* — Tutunjian & Bitetto, P.C.

(57) ABSTRACT

A computer-implemented method and apparatus for determining location, the method comprising: receiving a first sequence of kinematic values related to a route of an image appearing in captured pictures; receiving a second sequence of kinematic values related to a series of readings from at least one inertial sensor received from a mobile device; determining a matching measure between the first sequence of kinematic values and the second sequence of kinematic values; and associating an identifier associated with the mobile device with a location determined from the captured pictures.

27 Claims, 10 Drawing Sheets

(56) References Cited

U.S. PATENT DOCUMENTS

| | | | |
|---|---|---|---|
| 2013/0009994 A1* | 1/2013 | Hill | G06N 3/006 345/633 |
| 2013/0101155 A1* | 4/2013 | Jelinek | H04N 5/2327 382/103 |
| 2013/0101163 A1* | 4/2013 | Gupta | G06K 9/00671 382/103 |
| 2013/0130711 A1* | 5/2013 | Bergsbjork | H04W 4/02 455/456.1 |
| 2013/0211709 A1* | 8/2013 | Takahashi | G01C 21/30 701/417 |
| 2014/0114561 A1* | 4/2014 | Pakzad | G01C 21/206 701/410 |
| 2014/0176418 A1* | 6/2014 | Ramachandran | G01C 21/165 345/156 |
| 2014/0192205 A1* | 7/2014 | Bahadirov | H04N 5/144 348/169 |
| 2014/0227991 A1* | 8/2014 | Breton | H04W 4/22 455/404.2 |
| 2014/0309752 A1* | 10/2014 | Yuzurihara | G05B 15/02 700/13 |
| 2014/0355832 A1* | 12/2014 | Thouy | G06K 9/623 382/103 |
| 2015/0085111 A1* | 3/2015 | Lavery | 348/143 |

* cited by examiner

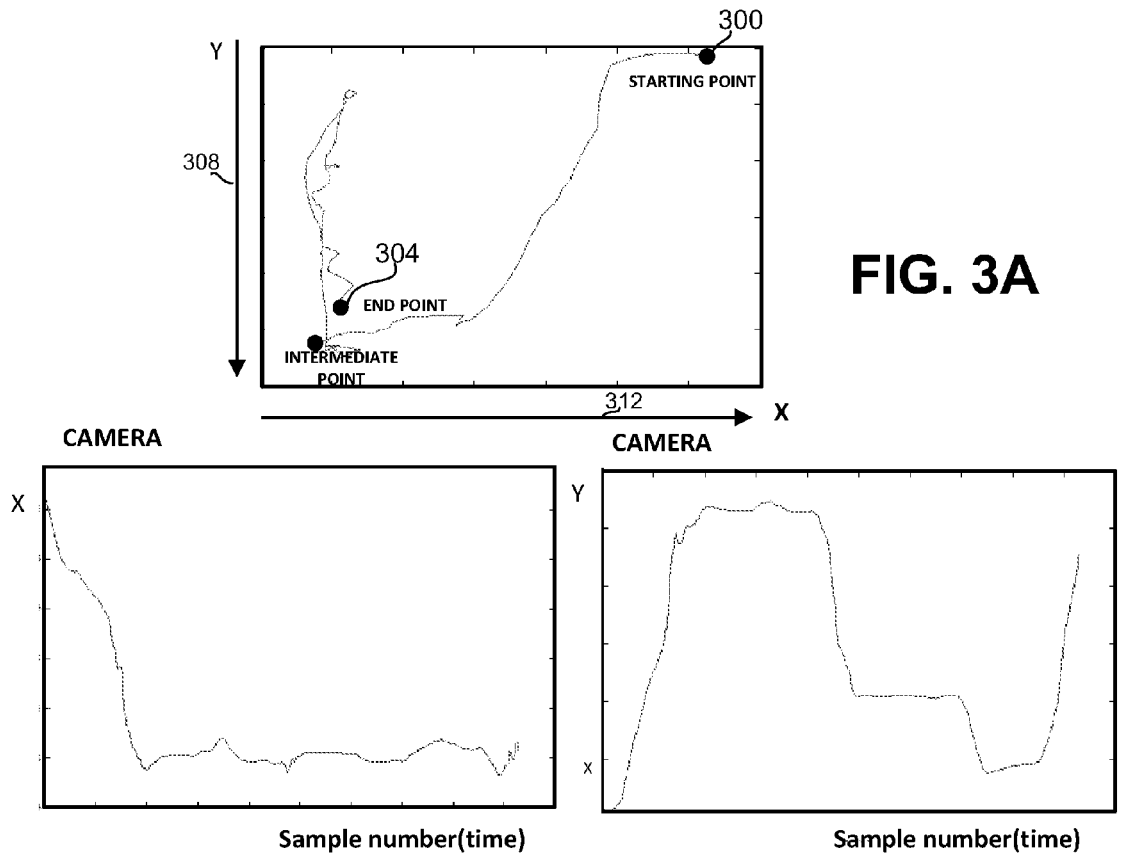
FIG. 3A
FIG. 3B
FIG. 3C
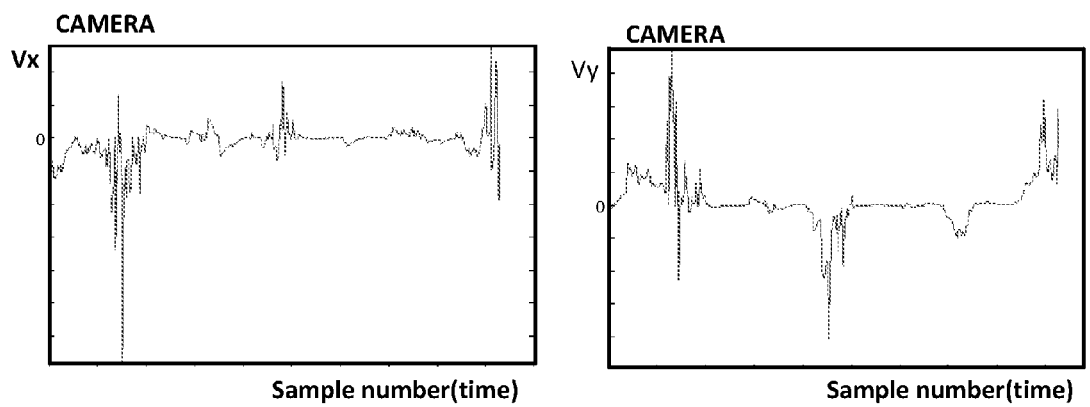
FIG. 3D
FIG. 3E

METHOD AND APPARATUS FOR DETERMINING LOCATION

TECHNICAL FIELD

The present disclosure relates to determining the indoor location of an object in general, and to a method and apparatus for determining the indoor location of an object based on a multiplicity of information sources, in particular.

BACKGROUND

In recent decades and particularly in recent years, electronic technology, including communication technology, has revolutionized our everyday lives. Portable electronic devices such as mobile phones, tablet computers, PDAs, or the like, have permeated the lives of almost every person. Mobile communication and computing devices, especially, have become the means by which countless millions conduct their personal and professional interactions with the world. It has become almost impossible for many people to function without access to their electronic devices, thus the devices are carried by their users almost constantly.

Determining the location of people and tracking their routes in some resolution has become easier and is often used for a variety of purposes, such as navigation, child security, location based services and others.

When a person is carrying a mobile phone, determining the person's location may be done by one or more of some known methods such as but not limited to arrival time methods, determining radiating cells closest to the mobile phone by considering the received signal strength, RF triangulation and trilateration methods, Global Positioning Systems (GPS) or the like.

In general, these methods are based on providing two or more transmitters and measuring signals that enable to determine a location of an object relatively to the transmitters. By measuring the intensity of the received signal and using models of wave propagation in a medium, the distance from a transmitter may be evaluated. In alternative embodiments, the distance between an object and a transmitting or receiving station which is at a known location may be evaluated by measuring the arrival time of a predetermined signal transmitted by the transmitter to the object, or the other way around. Repeating the process for a multiplicity of transmitters and crossing the results enable to provide an estimated location of the object in space. In alternative methods, the difference in arrival time of signals transmitted by two transmitters may be measured and used for evaluating the location.

These methods may be used indoors or outdoors. However, in indoor locations a serious limitation is for example the reduced signal to noise ratio caused in particular by increased multipath phenomena, which may be caused by reflection, diffraction or other effects of a close environment.

Additional location methods may be based upon identifying a pattern of parameters received at a location, such as the pattern of the signal intensity, from a particular network, the general noise pattern, or the like. A table indicating the pattern may be constructed for each location, and when it is required to identify the location of an object, the pattern received by the object may be compared to entries in the table, such that the entry containing the closest pattern is indicative of the device location.

Yet additional location methods may be based on dead reckoning, for example inertial navigation systems (INS), hybridization, or a fusion of any two or more of the methods.

However, these techniques may require special equipment or expensive infrastructure. Some of these methods may also suffer additional drawbacks. For example, GPS-based method are limited to outdoor locations, in which a navigation device or a navigation system within a mobile phone, for example, has line of sight to satellites and can receive direct satellite signals.

Determining the accurate indoor location of a person can be used for a multiplicity of purposes, including but not limited to: providing navigation instructions to an indoor location, presenting information, suggesting promotions or coupons, activating systems for example illuminating certain areas when a person is approaching, displaying commercials on a billboard, locating children, or others.

BRIEF SUMMARY

One aspect of the disclosure relates to a computer-implemented method performed by a computerized device, comprising: receiving a first sequence of kinematic values related to a route of an image appearing in captured pictures; receiving a second sequence of kinematic values related to a series of readings from one or more inertial sensors received from a mobile device; determining a matching measure between the first sequence of kinematic values and the second sequence of kinematic values; and associating an identifier associated with the mobile device with a location determined from the captured pictures. Within the method, the first sequence of kinematic values and the second sequence of kinematic values optionally comprise location indications. The method may further comprise integrating twice the series of readings from the inertial sensor. Within the method, the first sequence of kinematic values and the second sequence of kinematic values optionally comprise velocity indications. The method may further comprise integrating the series of readings from the inertial sensor and deriving the route of the image appearing in captured pictures. Within the method, the first sequence of kinematic values and the second sequence of kinematic values optionally comprise acceleration indications. The method may further comprise deriving twice the route of the image appearing in captured pictures. The method may further comprise taking an action related to the user and to the location determined from the captured pictures. The method may further comprise: determining a multiplicity of matching measures between a first sequence of kinematic values and two or more second sequences of kinematic values; and associating an identifier associated with the mobile device which provided a second sequence having best match with the first sequence. The method may further comprise: receiving a series of captures from one or more capturing devices; and determining the first sequence of kinematic values based on an image appearing in the captures. The method may further comprise starting communication between the computerized device and the mobile device. The method may further comprise: receiving a sequence of inertial values from the mobile device; and determining the second sequence of kinematic values from the sequence of inertial values. Within the method, one or more values associated with the second sequence are optionally set to a kinematic values obtained from the captured pictures. Within the method, the kinematic value is optionally velocity obtained from the captured pictures. Within the method, the kinematic value is optionally a starting location of a route obtained from the captured pictures.

Another aspect of the disclosure relates to a method for performed by a computerized device, comprising: receiving spatial data from a mobile device; receiving a mapping between locations and earlier collected spatial data; and based on the spatial data and on mapping between locations and earlier spatial data, associating the spatial data with a location, wherein the mapping is created using a combination of a first sequence of kinematic values related to a route of an image appearing in captured pictures and a second sequence of kinematic values related to a series of readings of one or more inertial sensors received from a mobile device.

Yet another aspect of the disclosure relates to an apparatus having a processing unit and a storage device, the apparatus comprising a server platform, the apparatus comprising: a first kinematic value sequence receiving for receiving a first sequence of kinematic values related to a route of an image appearing in captured pictures; a second kinematic value sequence receiving for receiving a second sequence of kinematic values related to a series of readings from one or more inertial sensors received from a mobile device carried by a user; a sequence matching component for determining a matching measure between the first sequence of kinematic values and the second sequence of kinematic values; and an identifier and location association component for association the mobile device with a location obtained from the captured pictures. Within the apparatus, the first sequence of kinematic values and the second sequence of kinematic values optionally comprise location indications, and wherein the series of readings from an inertial sensor is integrated twice. Within the apparatus, the first sequence of kinematic values and the second sequence of kinematic values optionally comprise velocity indications, and the series of readings from the inertial sensors is optionally integrated, and the route of the image appearing in captured pictures is optionally derived. Within the apparatus, the first sequence of kinematic values and the second sequence of kinematic values optionally comprise acceleration indications and a route of the image appearing in captured pictures is optionally derived twice. The apparatus can further comprise an action initiating component for taking an action related to the user and to the location determined from the captured pictures. Within the apparatus, the sequence matching component is optionally adapted to determine a multiplicity of matching measures between a first sequence of kinematic values and two or more second sequences of kinematic values; and to associate the mobile device which provided a second sequence having best match with the first sequence. The apparatus may further comprise: a camera communication component for receiving the series of captures from one or more capturing devices; and a first kinematic value sequence determination component for determining the first kinematic value sequence based on an image appearing in the captures. The apparatus may further comprise a mobile device communication component establishing communication between the server platform and the mobile device. The apparatus may further comprise a second kinematic value sequence receiving component for determining the second sequence of kinematic values from the sequence of inertial values. Within the apparatus, the sequence matching component is optionally executed by the mobile device. The apparatus may further comprise a location and spatial data association component for associating a point or area with spatial data received at the point or area and for receiving spatial data set and retrieving a point or area associated with a stored spatial data set being closes to the spatial data set.

Yet another aspect of the disclosure relates to a computer program product comprising: a non-transitory computer readable medium; a first program instruction for receiving a first sequence of kinematic values related to a route of an image appearing in captured pictures; a second program instruction for receiving a second sequence of kinematic values related to a series of readings from one or more inertial sensors received from a mobile device; and a third program instruction for determining a matching measure between the first sequence of kinematic values and the second sequence of kinematic values; and a fourth program instruction for associating an identifier of the mobile device with a location determined from the captured pictures, wherein said first, second, third and fourth program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 3A is a top view of a path taken by a person or an object within an area;

FIG. 3B and FIG. 3C show a graph of the taken X and Y paths, respectively, as obtained from images captured by a camera, in accordance with some exemplary embodiments of the disclosed subject matter;

FIG. 3D and FIG. 3E show unfiltered graphs of the velocity in the X and Y directions, respectively, as obtained by deriving the location graph, in accordance with some exemplary embodiments of the disclosed subject matter;

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is the need to determine in an accurate manner the location of a moving object and in particular of a person in an area, whether the person is in an indoor or outdoor environment.

Figure 1:
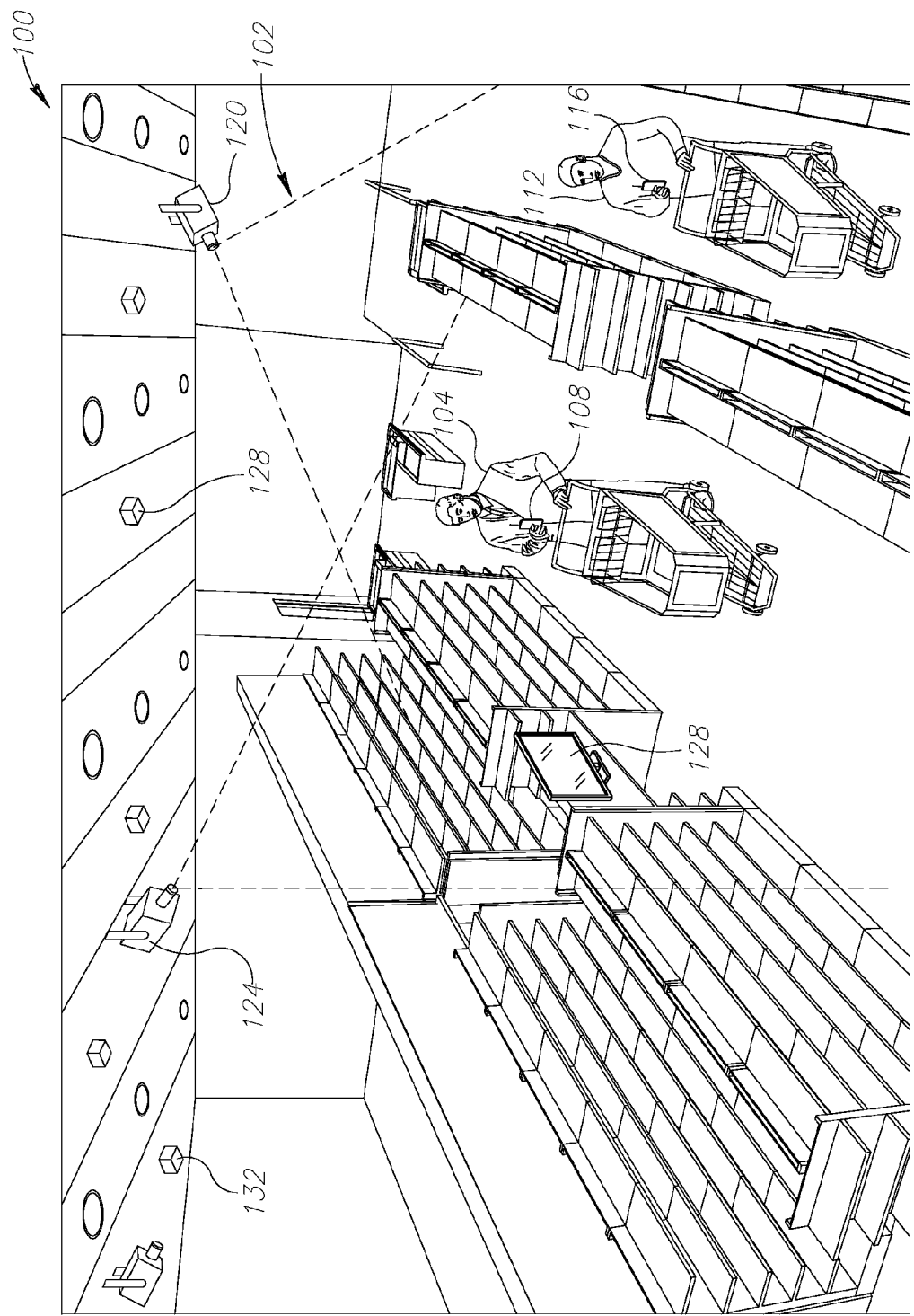
FIG. 1 shows an environment in which it may be desired to track people.

Referring now to FIG. 1, showing an exemplary environment in which it may be desired to track the route taken by one or more people whose identities, or at least identifiers of their mobile devices, are known.

Environment 100 shown in FIG. 1 comprises a supermarket 102, having a plurality of shelves and aisles. Persons, such as person 104 or person 112 may be walking and occasionally stopping in the supermarket, and may carry a mobile device 108 or 116, respectively, such as a cellular phone, a smart phone or the like.

If any detail of person 104 is known by the connection to mobile device 108, when person 104 passes at the location shown in FIG. 1, electronic billboard 128 may present a direct addressing, for example "Good morning John, cereal is on sale". Even further, if information is available which relates to the shopping habits of person 104, the message can be even more focused, for example suggesting a type of cereal the person bought before. In another example, for example if no detail beyond details of phone 108 are known, a message may be sent to mobile device 108 informing person 104 about a sale, or the like. For exact targeting, it may be required to differentiate between the routes taken by person 104 and person 112, and to associate the route of each of them with the correct mobile device, so as to address the device or the person at the location.

Tracking a person's location using a cellular network and information about the closest cells provides coarse information which may not be enough for accurate tracking for purposes such as advertising, children care or the like. GPS systems, are also ineffective indoors, as there is no line of sight (or near line of sight) between the satellites and corresponding devices.

Other RF based indoor positioning techniques, are generally not accurate enough, since the noise caused by the multipath phenomena is significantly enhanced in indoor environment. This may happen due to the interaction of the special RF characteristics of the common communication standards used in current technologies, like Wi-Fi, Bluetooth, cellular standards etc., with the physical structure generally present in indoor environment, such as walls, furniture etc., by ways of diffraction, refraction and deflection. Increasing the accuracy of these techniques might prove cumbersome and expensive.

Other RF techniques may include spatially-fingerprinting the RF environment and then using pattern-recognition or classification techniques, to try and find the location of the receiver/transmitter. Such techniques require spatial calibration and may therefore suffer from degrading accuracy due to the dynamic nature of the RF parameters, magnetic parameters, or other parameters that characterize the location, which may change as time passes since calibration took place.

Some known solutions suggest the usage of cameras and corresponding tracking algorithms, in combination with Wi-Fi Access Points (AP) to obtain a location indication of a person holding a Wi-Fi enabled mobile device. Such solution is described in U.S. Patent Application no. US2004/0044355 entitled "Calibration of Wi-Fi Localization from Video Localization" incorporated herein by reference in its entirety for all purposes. When using cameras for capturing and tracking objects, one or more cameras such as video cameras 120 and 124 may be spread over the required area, such that their viewports substantially cover the required parts of the location. Tracking algorithms are used for tracking one or more moving objects within the viewport of each camera, or when the objects move between different viewports. The tracking algorithms may also handle joining and separation of the moving objects, for example when people stop near each other and then part, walk together for a while, or just cross each other's way. Exemplary algorithms are described in U.S. Pat. No. 7,683,929 entitled "System and Method for Video Content Analysis-Based Detection, Surveillance and Alarm Management" incorporated herein by reference in its entirety. In order to associate an object taking a route with a specific mobile device and optionally with a person carrying it, the locations of one or more mobile devices are triangulated or trilaterated using Wi-Fi stations such as stations 128 or 132 located in the area. Crossing the locations known from the images with the locations obtained from the Wi-Fi triangulation provides the identity of an object such as a mobile device in a location.

The output of each such triangulation or trilateration provides one or more ellipses or other closed geometrical shapes, each associated with a certainty degree that the particular subject is within the shape.

Figure 2:
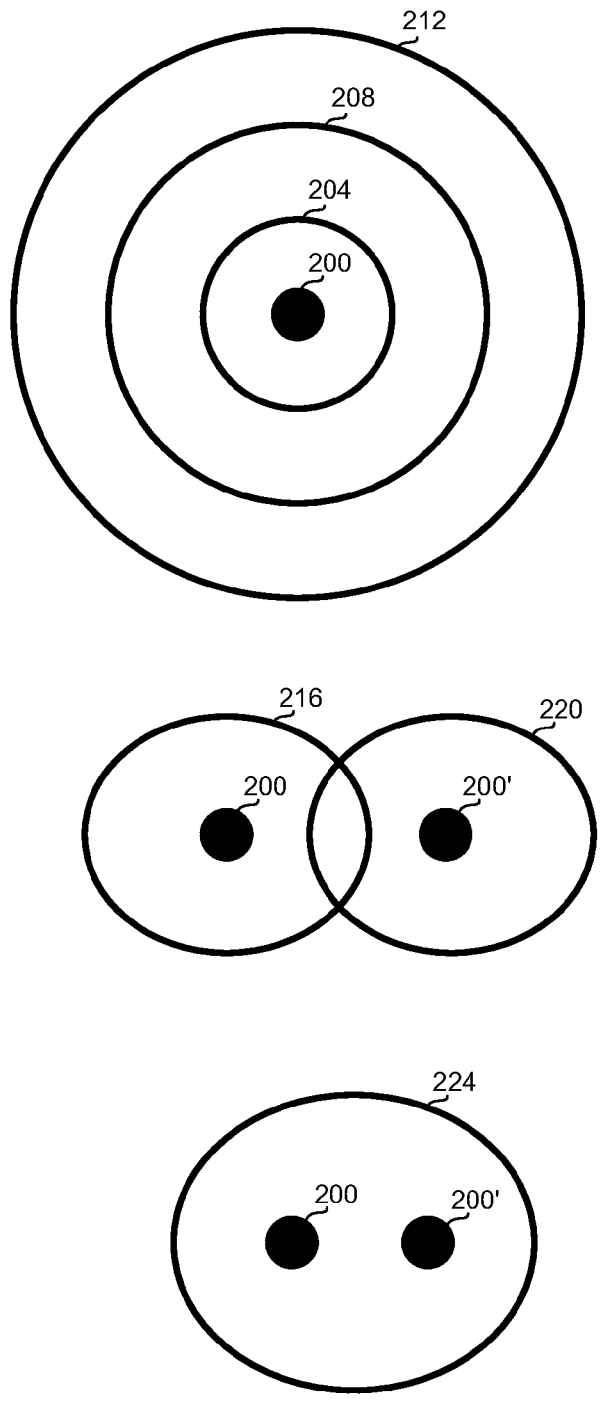
FIG. 2 shows a schematic illustration of a problem associated with using W-Fi technology for indoor location.

Referring Now to FIG. 2 showing some typical cases of tracking using Wi-Fi triangulation or trilateration.

When tracking object 200, a series of geometrical shapes, such as ellipses 204, 208 and 212 may be provided by Wi-Fi triangulation or trilateration, each associated with a certainty degree that object 200 is within the shape, the certainty degree increases as the size of the ellipse increases. For example, ellipse 204 may be associated with 20% certainty that object 200 is indeed within ellipse 204, ellipse 208 may be associated with 50% certainty that object 200 is within ellipse 208, and ellipse 212 may be associated with a 85% certainty that object 200 is within ellipse 212. However, as the ellipse size increases, the significance of the location of the subject inside the ellipse drops. For example, indicating that a person is within a 150 feet range inside a supermarket may be meaningless for some applications.

Further, two targets may be tracked only if two ellipses, each containing exactly one of the targets, may be defined with sufficient certainty degree, such as object 200 comprised in ellipse 216, and object 200' comprised in ellipse 220.

In another example, if the smallest ellipse having sufficient certainty degree still comprises two or more objects, such as ellipse 224 containing object 200 and object 200', it is impossible to associate each of the objects with a corresponding identity. As a partial solution, the center of mass of the ellipse may be associated with the two or more smartphones' holders.

One technical solution for indoor location determination comprises: determining a route of an object such as a person carrying a mobile device (referred to as "object") by capturing the object using one or more cameras, and tracking the object by using tracking algorithms (the route of the objects or any derivative thereof is collectively referred to as the "camera route"); estimating a route of a person carrying a mobile device, based on output obtained from inertial sensors comprised in the device (the inertial sensor output, or any mathematical operation thereon such as integration, is collectively referred to as the "inertial route"); matching the camera route for an object with one or more inertial routes for one or more mobile devices; determining the inertial route that best matches the camera route; and associating the mobile device that provided the best matching of the inertial route with the camera route, thus providing the exact location of the object, for example the device or the person carrying the device. It will be appreciated that similarly to a step of the camera and Wi-Fi localization technology described above, the viewports of the cameras, i.e., the areas shown in images captured by the cameras have to be correlated to actual coordinates, such as coordinates in the North-East-Down (NED) system, so that coordinates obtained from the cameras and coordinates obtained from the inertial sensors can be matched or compared.

Referring now back to FIG. 1, person 104 and person 112 are captured by cameras 120 and 124 as detailed above. However, each mobile device such as device 108 or 116 transmits readings obtained by kinematic sensors such as inertial sensors embedded therein, for example to stations 128 and 132, which may be Wi-Fi stations or access points, cellular communication facilities or antennas, or the like.

A computing platform associated with stations 128 and 132, which may be collocated with stations 128 and 132 or remote, matches the routes or routes' derivatives such as velocity or acceleration, and associates a location with the mobile device or its owner or holder.

It will be appreciated that the matching can be performed separately for each axis, and the matching results for the separate axes may be combined, for example selecting the best match according to the average between the two or three one-dimensional matches.

It will also be appreciated that the matching has to be performed over comparable elements. Thus, the actual route as determined by the camera and video tracking may be compared against the double integral of the inertia reported by the inertial sensors, optionally with some offset, thus comparing locations. Alternatively, the derivative of the actual route determined by the camera may be compared against the integral of the inertia measures thus comparing velocities. In yet another alternative, the output of the inertial sensors may be compared against the second derivative of the actual route determined by the camera thus comparing inertias.

The output of the inertial sensor input may be passed to a computing platform, for example via Wi-Fi or cellular communication. The computing platform may also receive the video capturing and may determine the route taken by the person, or it may receive the route from another source. The computing device may then do the actual route matching and determine the device taking the route. The computing device may also take an action related to a person associated with the device, if known, such as presenting an ad, helping in navigation, help find a child, activate a system, or the like. The action may also be associated with other information available if the person or details related to the person are known, for example items the person previously searched for on the device or on another device, the person's habits, or the like.

It will be appreciated that although FIG. 1 shows people holding mobile devices, the disclosure is not limited to such embodiments. For example, a person may place the mobile device on a moving object such as a shopping cart or a stroller rather than hold it. Even further, the mobile device may be carried by a machine such as a robot rather than by a person, wherein commands may be provided to the machine once the mobile device is identified. In further embodiments the functionality of the mobile device may be embedded into the machine.

As described above, if the camera based track and the smartphone's based track produce tracks having a similarity measure exceeding a threshold, the common track may be assumed to be correct. However, although the camera's produced track represents quite well the object's track, the track based on the smartphone accelerations is sometimes quite different. The differences may be caused by errors including the possible inaccuracy of each sensor, the relative differences among the sensors, errors in projecting the inertial sensors' output to a common coordinate system, and the need to integrate the acceleration twice in order to produce tracks from the smartphone's acceleration, wherein the double integration may significantly intensify any existing error. All these errors may be combined such that the obtained route eventually significantly diverges as time elapses, until the resulting track cannot be matched to the camera track.

Tracking the inertial route may be improved if high quality and high accuracy sensors are used. In addition, the computation error accumulated throughout the integration may be bound by combining other measurements available from other sources. The error may be further bound by using filtering techniques such as statistical filtering, for example Kalman filter, which is a commonly used filtering technique for estimation problems. Other techniques may include zero velocity updates to nullify the velocity when certain events are detected, for example deciding that a person is not moving due to the absence of detected human steps, which can be quite easily detected from a smart phone's inertial sensors.

Another example for keeping the calculated inertial track aligned with the real track for matching purpose is as follows: the velocity measured at a certain point of the track produced by the camera may be introduced to the inertial route calculation instead of the inertial-calculated velocity, thus eliminating the error of one integration operation. If the matching between the camera route and a specific inertial route at a certain point was correct, then the velocity obtained from the camera route is indeed the velocity of the correct person or device, once the device route and the camera route are time-synchronized. Once this velocity is used at the inertial route, this velocity update may reduce the errors and drifting accumulated along the route, so that the two tracks will keep being closer. However, if the matching was wrong and a wrong velocity is provided to the inertial track calculation, the error will intensify and the tracks will drift further.

Thus, by introducing a velocity or another relevant parameter from the camera route to the inertial route calculation, if the matching was correct it may bind the error such that the inertial route will have a higher chance of continuing to be correct, but if it was wrong and a velocity associated with a non-matching route is introduced, the error will grow and the tracks will drift apart further. Thus, this parameter "injection" may sharpen the distinction between correct and incorrect matching, and facilitate selecting the correct match for camera route from among a multiplicity of inertial routes.

Different or additional parameters that may be introduced to the inertial route to improve its calculation might be, for example, the detection of the user's steps, which may include the number of steps, the stride length, the velocity at one or more parts of the step, whether the user has stopped which implies a zero velocity, or the like. Such parameters may also help bind the accumulative integration error, thus improving the inertial route so that it can be matched correctly to a camera route.

Yet another technical solution relates to using the method and apparatus described above at a preliminary stage, while also receiving readings from the mobile devices related to spatial information of the device, such as reception level of known transmitters. Once the routes are determined, locations or areas may be mapped to the spatial information received from the mobile device when they were at the location.

Then, at runtime, a mobile device of a user may transmit the same type of spatial information, and based on the mapping between these readings and locations, the user's location may be determined and provided to the user's mobile device, or to any other device or application. The user's location and transmitted spatial information may also be used for enhancing the mapping.

One technical effect of the disclosure comprises the determination of a mobile device carried by a person captured and tracked using one or more cameras. The determination can be performed outdoor as well as indoor.

Figures 3F, 3G:
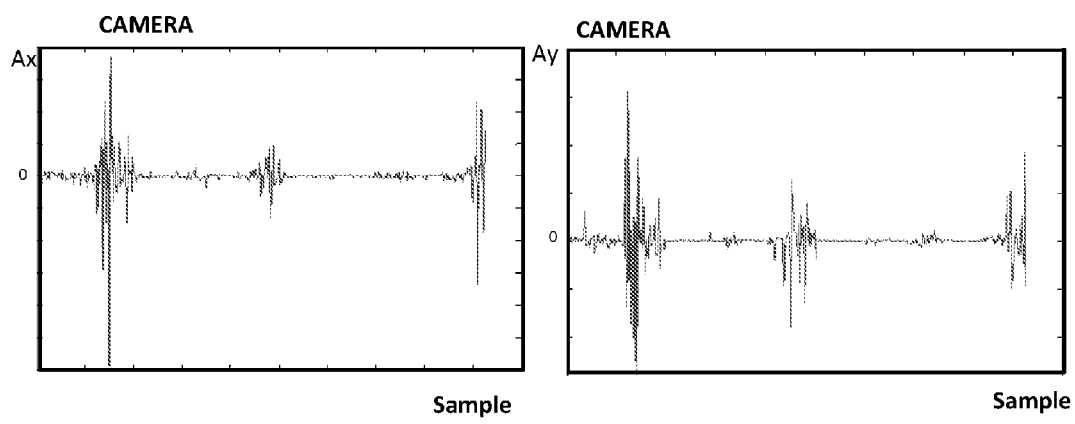
FIG. 3F and FIG. 3G show unfiltered graphs of the acceleration in the X and Y directions, respectively, as obtained by deriving the location graph twice, in accordance with some exemplary embodiments of the disclosed subject matter.
Figure 3H:
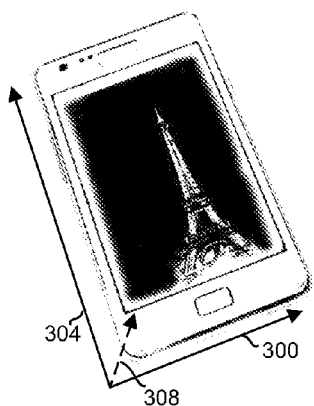
FIG. 3H is an illustration of a mobile device and its axes, in accordance with some exemplary embodiments of the disclosed subject matter.
Figure 3I:
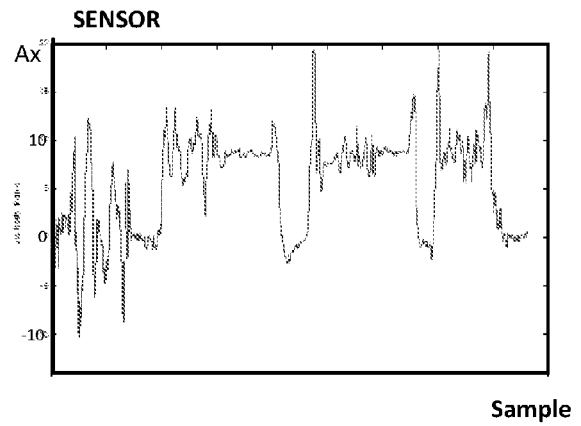
FIG. 3I, FIG. 3J and FIG. 3K show graphs of the acceleration in the X, Y, and Z directions relatively to the mobile device body, respectively, as obtained by the sensors embedded in the mobile device, in accordance with some exemplary embodiments of the disclosed subject matter.
Figure 3J:
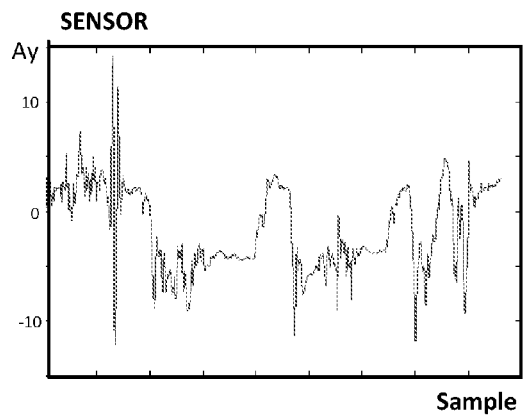
Figure 3K:
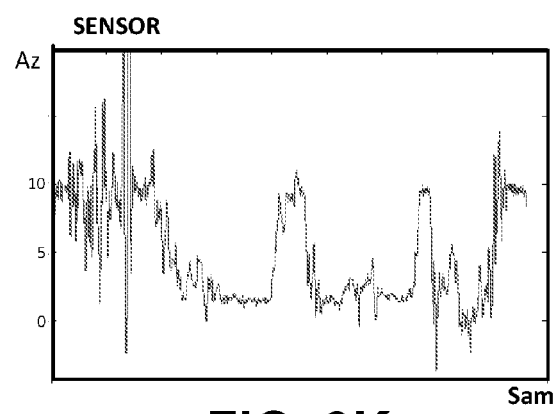
Figure 3L:
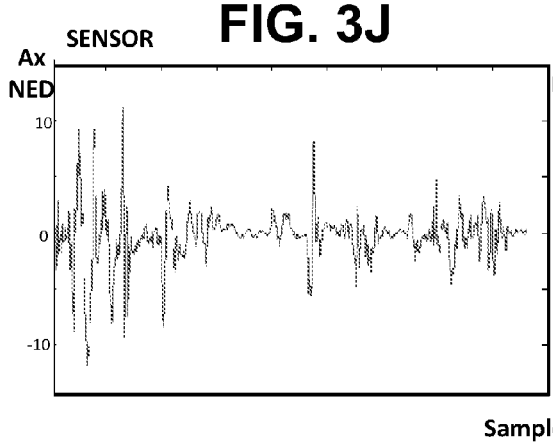
FIG. 3L and FIG. 3M show graphs of the acceleration in the North-East-Down (NED) X and Y directions, respectively, in accordance with some exemplary embodiments of the disclosed subject matter.
Figure 3M:
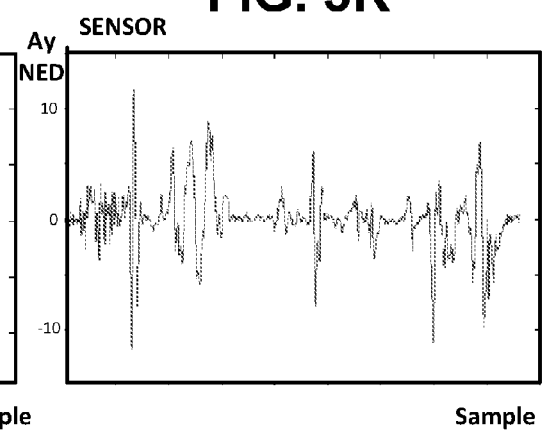
Figure 3N:
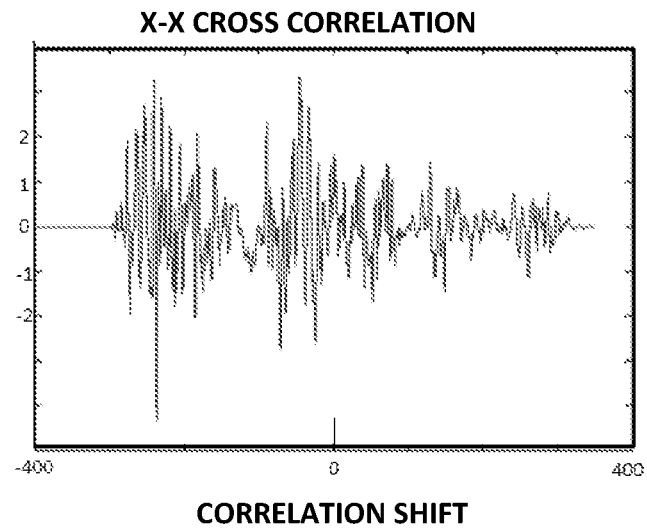
FIG. 3N and FIG. 3O show the unfiltered, normalized cross correlation graphs between the acceleration measurements of the camera and the sensors in the X and Y directions, respectively, in accordance with some exemplary embodiments of the disclosed subject matter.
Figure 3O:
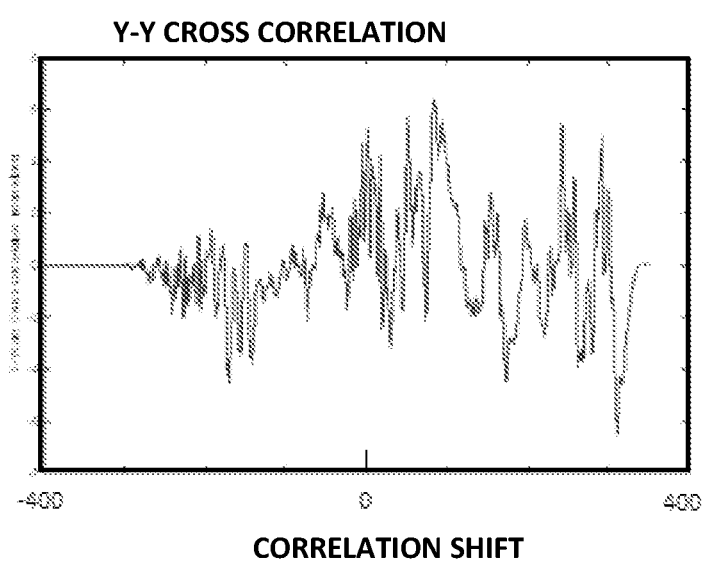

Referring now to FIGS. 3A-3O, demonstrating an exemplary case and results of the disclosed subject matter.

FIG. 3A shows a top view of a path taken by a person or an object within an area which may be a room, but may also be any other open or close space. It will be appreciated that the camera can be mounted anywhere and may take viewing angles other than a top view. In any case, a mapping is defined between the camera viewport and a coordinate system such as world coordinate system. The path starts at starting point 300 near one corner of the area and ends at end point 304 near the opposite corner. It may be noticed that during the last part of the path, the Y coordinates traversed a significant part of the area in both directions, i.e., the Y coordinate increased and then decreased, while the X coordinates of the path changed very little during that part. The coordinate increasing directions are shown by vertical arrow 308 for the Y direction, and by horizontal arrow 312 for the X direction.

Referring now to FIG. 3B and FIG. 3C, showing the X coordinates and Y coordinates, respectively, as a function of sample, of the person taking the path, as captured by a camera and tracked using tracking algorithms. It may be indeed seen that in FIG. 3B the X coordinates change insignificantly during the about last two thirds of the time, while FIG. 3C shows that during the last two thirds the Y coordinate decreased from close to the maximum to close to zero, and back to near the maximum.

Referring now to FIG. 3D and FIG. 3E, showing the velocities along the X and Y directions, as a function of sample, as obtained by deriving the locations shown in FIGS. 3B and 3C above. It may be seen that the velocity along the X direction demonstrates low values during large portions of the time, excluding some small areas mainly at the beginning and end of the path.

Referring now to FIG. 3F and FIG. 3G, showing the accelerations along the X and Y directions, as a function of sample, as obtained by deriving the velocities shown in FIGS. 3D and 3E above. It will be appreciated that deriving the locations to obtain the velocities, and deriving the velocities to obtain the accelerations amplifies the noises and inserts some significant spikes.

Referring now to FIG. 3H, showing an exemplary mobile device and three axes, wherein axis 300 is along the short dimension of the front face of the mobile device, axis 304 is along the long dimension of the front face of the mobile device, and axis 308 is perpendicular to the front face of the mobile device.

Referring now to FIGS. 3I, 3J and 3K, showing acceleration values obtained from acceleration sensors embedded within a mobile device carried by the person who took the path shown in FIG. 3A. The acceleration measurements were taken only on the part of the path between the intermediate point and the end point. The graphs of FIGS. 3I, 3J and 3K provide the accelerations of the sensors along the axes 300, 304 and 308 of FIG. 3H, respectively, i.e., along the short dimension of the front face of the mobile device, along the long dimension of the front face of the mobile device, and perpendicular to the front face of the mobile device, respectively.

It will be appreciated that if a mobile device is placed in a steady position, for example with its front panel up on a non-moving plan, the sensors indicating acceleration along the dimensions of the front panel will provide constant readings of about zero value, while the third sensor will provide steady reading of about 9.8 m/sec$^2$, due to the earth gravitation.

It will also be appreciated that due to the movements of the person carrying the device, which may include the person's moving along the X or Y world coordinates, as well as changing the way the person holds the device, accelerations along two or three of the dimensions of the device may be required for determining the accelerations in some arbitrary X and Y directions. Thus, for example in FIG. 3I showing the acceleration along the X axis, and in FIG. 3K showing the acceleration along the Z axis, significant portions of the graphs demonstrate accelerations in the area of 9.8 m/sec$^2$. Also, significant portions of the graph of FIG. 3I showing the acceleration along the X axis, and FIG. 3J showing the acceleration along the Y axis, demonstrate values in the area of −9.8 m/sec$^2$, due to changing the device's position in all dimensions relatively to the room coordinates.

Referring now to FIG. 3L and FIG. 3M, showing the accelerations in the X and Y dimensions, as obtained from the measures reported by the sensors embedded in the mobile device with respect to the mobile device body and transformed to the North-East-Down (NED) coordinate system, providing coordinates along the north-south and east-west directions, which may be obtained using inputs from the three sensors shown in FIGS. 3I, 3J and 3K above, and by measuring the device's heading from a magnetic compass. Alternatively, a built-in gyroscopic sensor may be tracked to obtain the mobile device attitude. The transformation between a vector in the device coordinate system and a corresponding vector in a world coordinate system may be performed by linear manipulation, using for example, matrix multiplication. Some mobile devices may provide this transformation in addition to the sampled sensor values.

Referring now to FIGS. 3N and 3O, showing the cross covariance in the X and Y dimensions, respectively, between the acceleration series as obtained from the camera and the acceleration series as obtained from the acceleration sensors, as a function of the shift between the acceleration series. The covariance has been determined only in respect to the part of the path between the intermediate point and the end point, since inertial measurements have been provided only to this part of the path.

Each of the accelerations series may be averaged, and the average value may be subtracted from the acceleration. The values may then be normalized using the standard deviation.

Given two normalized acceleration series, a set of shifted correlations may be determined for a multiplicity of shift values as follows:

$$\sum_t (a_1(t) * a_2(t-s)),$$

wherein s is a parameter indicating time shift between the two acceleration series. s is required since the sample acquisition time might not be synchronized between the two acceleration series, and thus a cross correlation operation shifted on several time shifts may be conducted to align the two series.

It will be appreciated that after having determined the time shift between the mobile device measurements and the camera locations, the time shift may be used to calculate a single (or a few) correlation value(s) instead of a multiplicity of values, thus eliminating the need to search the graph for a peak.

Due to the shift values range, the X-X cross correlation shown in FIG. 3N mainly refers to the later part of the path taken by the device, in which X does not change significantly, and indeed for no correlation value a significant correlation is demonstrated, since the acceleration along the X dimension is highly subject to measurements and calculation noises.

In FIG. 3O, however, demonstrating the Y-Y cross covariance, there is a significant peak, having a value of over 6 in the shift area starting at the vicinity of the middle and along the right hand side of the graph, indicating a shift of about 100 points. Such high correlation value indicates similarity between the accelerations measured by the camera and those determined by the sensors. The peak value being located not exactly where the shift is zero, indicates that the camera clock and the mobile device clock were not synchronized.

As long as there is one camera route and one inertial route to be compared, this time difference does not introduce a significant problem. However, when there is a multiplicity of possible inertial routes, such time differences in the peaks may lead to selecting the wrong match. In order to overcome this problem, the timing of the readings received from the camera and the mobile devices may be synchronized using any known synchronization method or protocol, such as Network Time Protocol (NTP).

In some embodiments, the acceleration as obtained by the camera may be correlated against a multiplicity of acceleration series obtained from sensors associated with a multiplicity of devices. The mobile device whose sensor acceleration series has the highest correlation peak with the series obtained from the camera, and wherein the peak may optionally also be larger from a predetermined threshold, may be determined to belong to the person captured by the camera, and location-based actions may be targeted to that person.

Another way to achieve correlation is to detect one or more kinematic patterns or features from the movements captured by the video cameras and the inertial sensors. For instance, matching the period during which a person stopped and continued walking by noticing zero translational movement via the camera, and tracking human steps pattern which are noticeable via the inertial sensors showing inertial peaks during the legs movement, thus enabling the identification of when probable zero movement is maintained.

Some embodiments may further combine data from the video cameras with data from the inertial sensor. For example, partial or piecewise routes may be obtained from the pictures taken by the video camera and from the data received from the inertial sensor. The piecewise routes may be taken every predetermined period of time, for example a few seconds to a few minutes. At the end of such predetermined period of time, the end points obtained from the two routes may be compared. If the difference is below a predetermined threshold, the end point of the route determined from the inertial sensor may be kept, but the continuation trajectory may be calculated using the velocity obtained from the camera route. It will be appreciated that the inertial route is a "floating" route since the coordinates of its starting point are unknown, thus, for comparison purposes the starting point of the inertial route may be taken as the starting point of the camera route.

Figure 4:
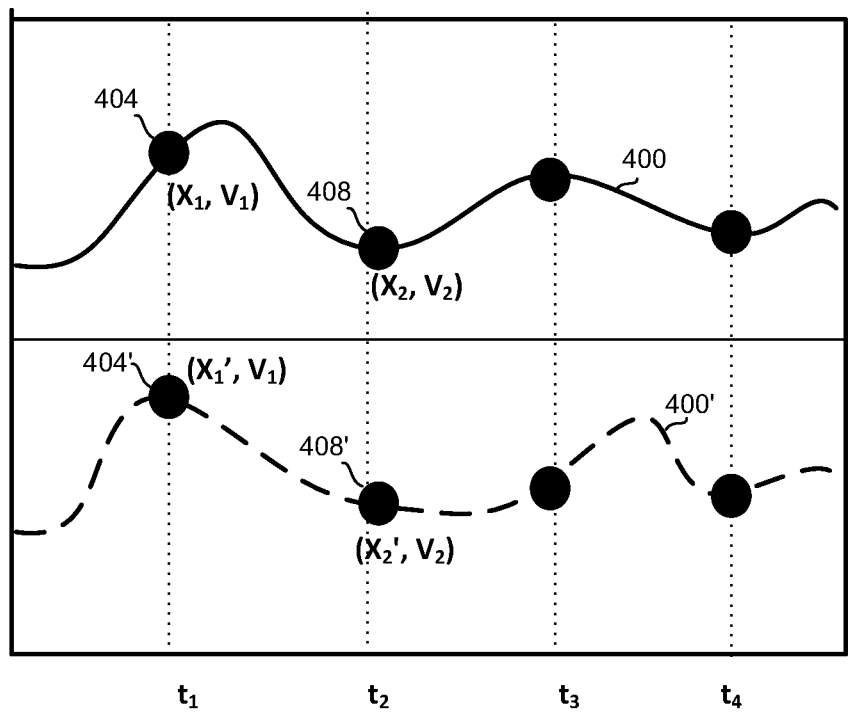
FIG. 4 shows an illustrative example of piecewise matching of routes, in accordance with some exemplary embodiments of the disclosed subject matter.

Referring now to FIG. 4, showing two routes, route 400 calculated from the captures of a video camera, and route 404' determined from readings obtained from inertial sensors. After a predetermined period of time, for example at time $t_1$, the locations obtained from the two trajectories, being point 404 from the camera and point 404' from the inertial sensors are compared. Point 404 is associated with a first location $X_1$, and the velocity at the point may be calculated and marked as $V_1$. Point 404' is associated with a first location $X_1'$. The inertial sensor route may thus be continued to be determined, using the velocity obtained from the camera route, instead of the velocity obtained by integrating the inertia values. Thus, from point $X_1'$, calculation will continue using location $X_1'$ and velocity $V_1$, and similarly from point $X_2'$ calculation will continue using location $X_2'$ and velocity $V_2$ obtained from the camera route. Thus, by piecewise matching of the velocity, the accumulated error in calculating the location, which is caused by double integration of the acceleration, may be reduced. By using a velocity assumed to be correct, only one integration is required at that point, which significantly reduces the error. It will be appreciated that comparing the tracks may be done by adjusting the starting points of the two routes or segments thereof, and examining the deviation between the two tracks when assumed to start at the same reference point, thus eliminating the accumulation of errors from previous segments. The adjustment may be performed by selecting the starting point of the relevant segment of the camera route, and adjusting the starting point of the segment of the inertial route accordingly. Combining this adjustment with using the velocity as received from the camera route into the inertial route and thus eliminating errors of one integration operation, provides for enhanced matching results. If, however, a velocity associated with another device is integrated into the calculation of the inertial route, the error will increase. Thus, aligning the starting point of the inertial route with that of the camera route, and using the velocity from the camera route for the inertial route provides for better matching results.

It will be appreciated that the matching and using the velocity obtained from the camera may be performed for each pair comprising the inertial sensor reading received from the mobile device, and one of the possible targets identified in the images captured by the camera, meaning that for each segment matching may be done between the mobile device route and each of a multiplicity of camera routes. The total score relating to the full route may be determined as the sum of the absolute values of the differences X'-X for all partial routes for each such pair of the mobile device route and one of the camera routes. The person captured by the video camera whose route has the smallest accumulated difference from the inertia-determined route may be associated with the mobile device providing the inertial values.

Referring now to FIG. 5, showing a flowchart diagram of a method for determining and using indoor tracking.

On step 500, a series of one or more captured pictures of a viewport may be received from a capturing device such as a video camera or any other camera. In some embodiments, a single capturing device may not be enough to cover the whole area, for example the whole supermarket. In such cases multiple cameras may be used, with or without overlapping areas, i.e., areas covered by two or more devices.

On step 504, the captured pictures may be processed to identify and track images, such as images of a human being within the viewport. The images may be tracked within a series of pictures depicting the same viewport, or between pictures belonging to two or more devices, for example when the image moves from the viewport of one device to the viewport of another device. Tracking may be performed using any techniques, for example as described in U.S. Pat. No. 7,683,929, entitled "System and Method for Video Content Analysis-Based Detection, Surveillance and Alarm Management" incorporated herein by reference in its entirety.

In some embodiments, a result of the tracking may be a first sequence of kinematic values for an image appearing in the pictures. The kinematic values may consist of the location of the image, in the coordinates of the viewport, in absolute world coordinates, in relative coordinates within the area, or the like. Each location may be represented as a two or three dimensional size.

Further kinematic values may be the velocity in one or more directions or axes, which may be obtained from deriving the location values, or the acceleration values obtained for example from deriving the location values twice. The derivation may be performed in respect to some arbitrary x and y dimensions, in north-south and east-west directions, or in any other axes.

The number of samples per seconds acquired from the camera should be determined by the captured motion characteristics. For example when humans are involved, a sampling rate of between about 10 and about 50 samples of kinematic values per second may provide acceptable results.

On step 508, communication may be established between a server and a mobile device. The communication may be established by enrolling in a station by entering the mobile device number or another identifier of the device or of the person, by sensing a signal sent to mobile devices such that one or more mobile devices may reply with required details, or the like. Step 408 may be performed before or during steps 400 and 404 are performed.

On step 512 a sequence of inertial values may be received from the mobile device. The inertial values may be obtained by one or more inertial sensors embedded within the mobile device. The inertial sensors may provide the inertia in north-south and east-west directions or in any other direction. The inertial values may be measured and transmitted every about predetermined period of time, for example between every about 50 ms and about 1000 ms. The inertial values may be transmitted to a computing platform using for example Wi-Fi communication, cellular communication, or any other wireless or even wired communication. Additional data and in particular spatial data may also be received from the mobile devices. For example, each such device may report the intensity at which it receives signals from transducers such as Wi-Fi transducers located at different locations in the environment, the cellular cell nearest to it, the local magnetic field measured by the smartphone's magnetic sensors, and/or any other data. This data may be used in the method of FIG. 5B described below.

On step 516 a second sequence of kinematic values may be obtained from the inertial values. The sequence may comprise the inertia values as received without further processing, inertia values transformed to another coordinate system, velocity values for obtaining which the inertial values are integrated, or position values for obtaining which the inertia values are integrated twice.

The number of samples per second acquired from the mobile device can be determined by the captured motion characteristics. For example when humans are involved, a sampling rate of between about 10 and about 50 samples of kinematic values per second may provide acceptable results.

It will be appreciated that the first and second kinematic value sequences may be coordinated, for example both may refer to locations, in which case the first sequence is not to be derived and the second sequence is to be integrated twice; both may refer to velocity in which case the first sequence is derived once and the second sequence is integrated once; or they may both relate to acceleration in which case the first sequence is to be derived twice and the second sequence is not to be integrated.

On step 520 a matching measure may be determined between the first sequence and the second sequence. The matching may be performed separately for each dimension, or a combined measure may be determined.

In some embodiments, the matching may be performed for a part of the route rather than the full route of the person or the device. In further embodiments, the matching may be performed piecewise, for example for route segments limited in a predetermined period of time, such as between a fraction of a second and a few seconds. The segment may also be limited to a predetermined length. When performing piecewise matching, information from one of the routes may be used in calculating the other route. For example, the velocity at the end of a segment as obtained from the camera route may be used as the initial velocity for calculating the continuation of the route based on the inertial sensors.

If piecewise matching is performed, then steps 500, 504, 508, 512, 516 and 520 described above may be repeated for each segment, and information related to any of the segments may be used in calculating the following segment or segments, in order to enhance accuracy, save calculations, or other purposes.

Matching may be performed using any known method for graph matching, for example least squares (LP Norms), CSS or others. In some embodiments, when matching accelerations or velocities, cross correlation may be used.

It will be appreciated that step 520 may be repeated for a number of sequence pairs, for example the route of an image may be compared against a number of routes received from mobile devices that provided inertial sensor information.

It will be appreciated that the first and second kinematic value sequences, wherein the first sequence may be obtained from a set of pictures and the second set may be obtained from inertial sensors readings, may be determined by and obtained from different computing platforms, and even from a computing platform other than the one that does the matching between the sequences.

On step 524, an identifier associated with one of the second sequences, for example an identifier of a mobile device that provided the sequence that best matches the first sequence may be determined, and may be associated with a route or location, for example the route or last location as determined from the captured images.

Optionally, an action may take place which makes use of the determined location, for example displaying an advertisement on a nearby billboard, sending a message to the mobile device related to a nearby product, turning the lights or another system on or off, firing an alarm if the person carrying the mobile device approached a location, or the like.

Figure 5A:
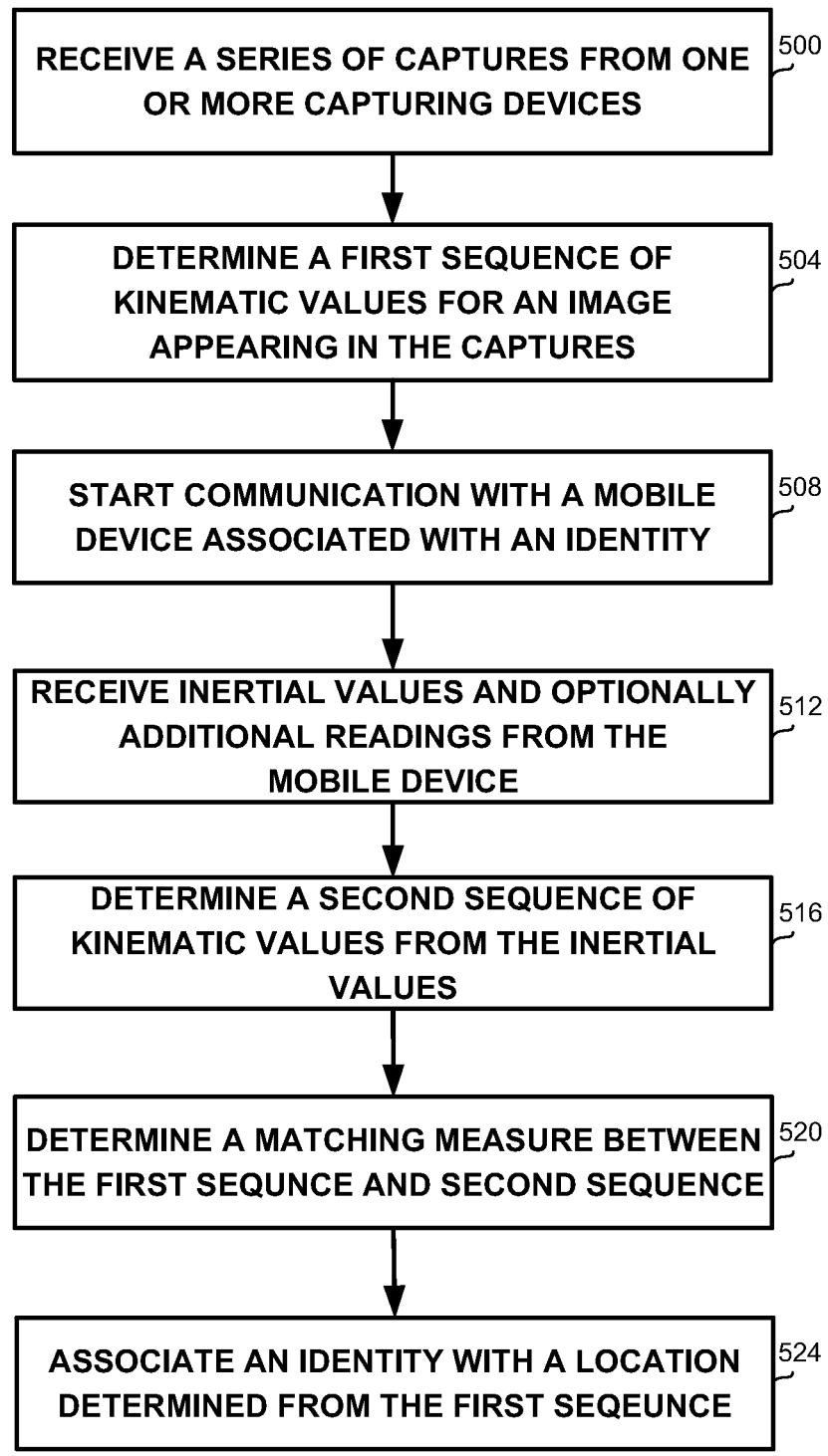
FIG. 5A shows a flowchart diagram of a method for determining and using indoor tracking, in accordance with some exemplary embodiments of the disclosed subject matter.
Figure 5B:
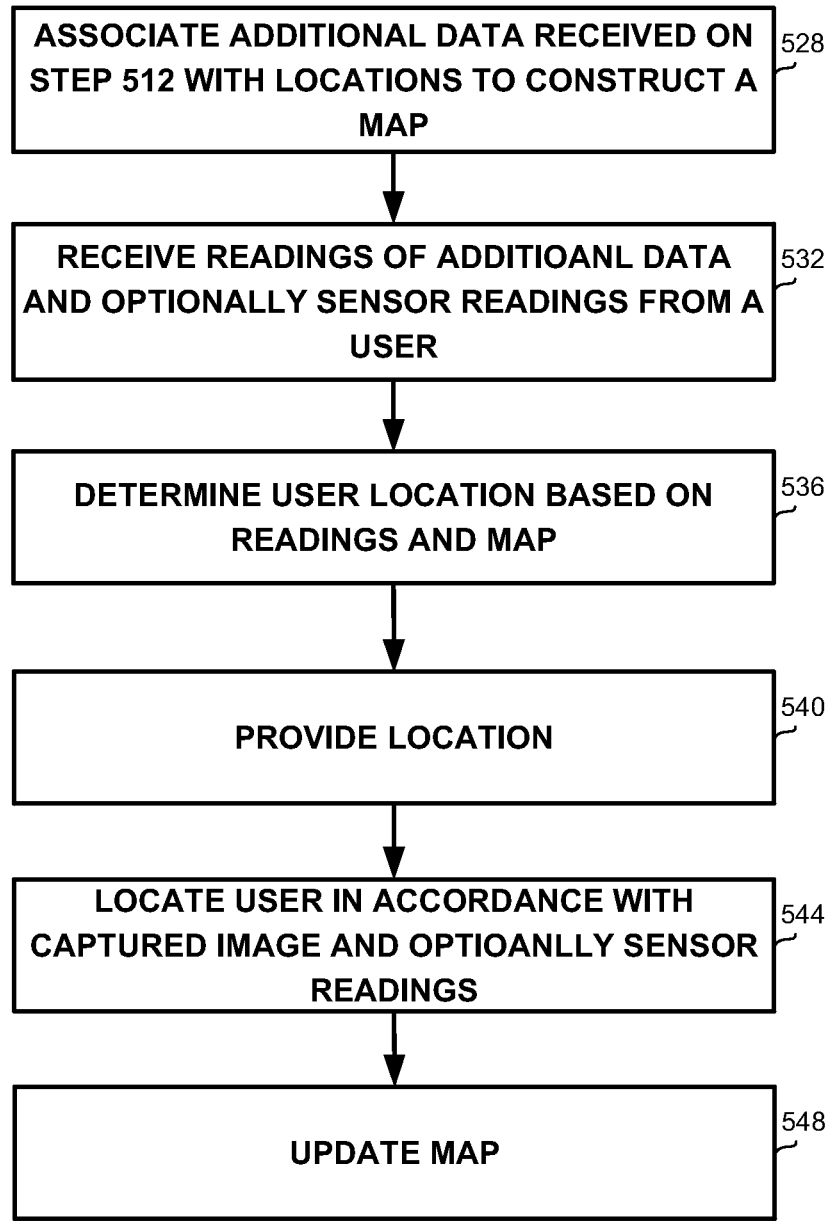
FIG. 5B shows a flowchart diagram of a further method for determining and using indoor location, in accordance with some exemplary embodiments of the disclosed subject matter.

Referring now to FIG. 5B, showing a flowchart diagram of a further method for determining and using indoor tracking.

The method of FIG. 5A may be performed as a basis or on a preliminary mapping stage for the method of FIG. 5B. For example, the method of FIG. 5A may be performed, and routes of people, such as employees employed at a location to be mapped, may be determined. In some embodiments, the people, for example the employees may be made easier to recognize in captured video, for example by wearing special hats, holding a specific item, or the like.

The additional data received on step 512 may include spatial information related to the particular point in the space at which the device is located at the time, such as received Wi-Fi transducers and intensities, cellular cell, the specific device model, phone orientation, received signals, or the like.

Once the routes are determined, on step 528 the additional data received on step 512 for one or more particular points or areas may be associated with the point or area in the space. Thus, a mapping may be created between points or areas in the space, and a set of spatial data. For example, a set obtained by averaging a multiplicity of readings received from an area in the space may be associated with that area. Alternatively, such mapping may be received from any external source.

On step 532, readings of the same parameters as received on step 512 and used for constructing the mapping on step 528, may be received from users, such as shoppers in a mall, visitors in a museum or the like. It will be appreciated that sensor data may also be received from the user, as described in association with step 512 above.

On step 536, the user's location may be retrieved based on the readings received on step 532 and on the mapping, by searching for the point or area of the map for which the associated data set is the closest. The closeness metric may be any known metric such as minimum squares, weighted minimum squares, or the like. Searching the area associated with the closest parameter values may be performed using probabilistic techniques such as machine learning techniques that use classification algorithms, neural networks or others.

On step 540, the user's location may be provided to the user's device and may be used for any purpose or by any application. Alternatively, the user's location may be provided to any third party such as any other user or application, for any purpose.

On step 544, the sensor readings, for example the readings similar to those used for constructing the routes on FIG. 5A, may also be used for calculating the routes of the user, for example as described in association with FIG. 5A above.

On step 548, the location of the user, as retrieved from calculating the route, may be used for updating or enhancing the mapping on an on-going basis. Based on the exact location of the user and the provided readings, the map may be enhanced and the data set associated with each point or area may be updated. It will be appreciated that the mapping may also be updated based on continuing reports received as described in association with step 528 above.

Figure 6:
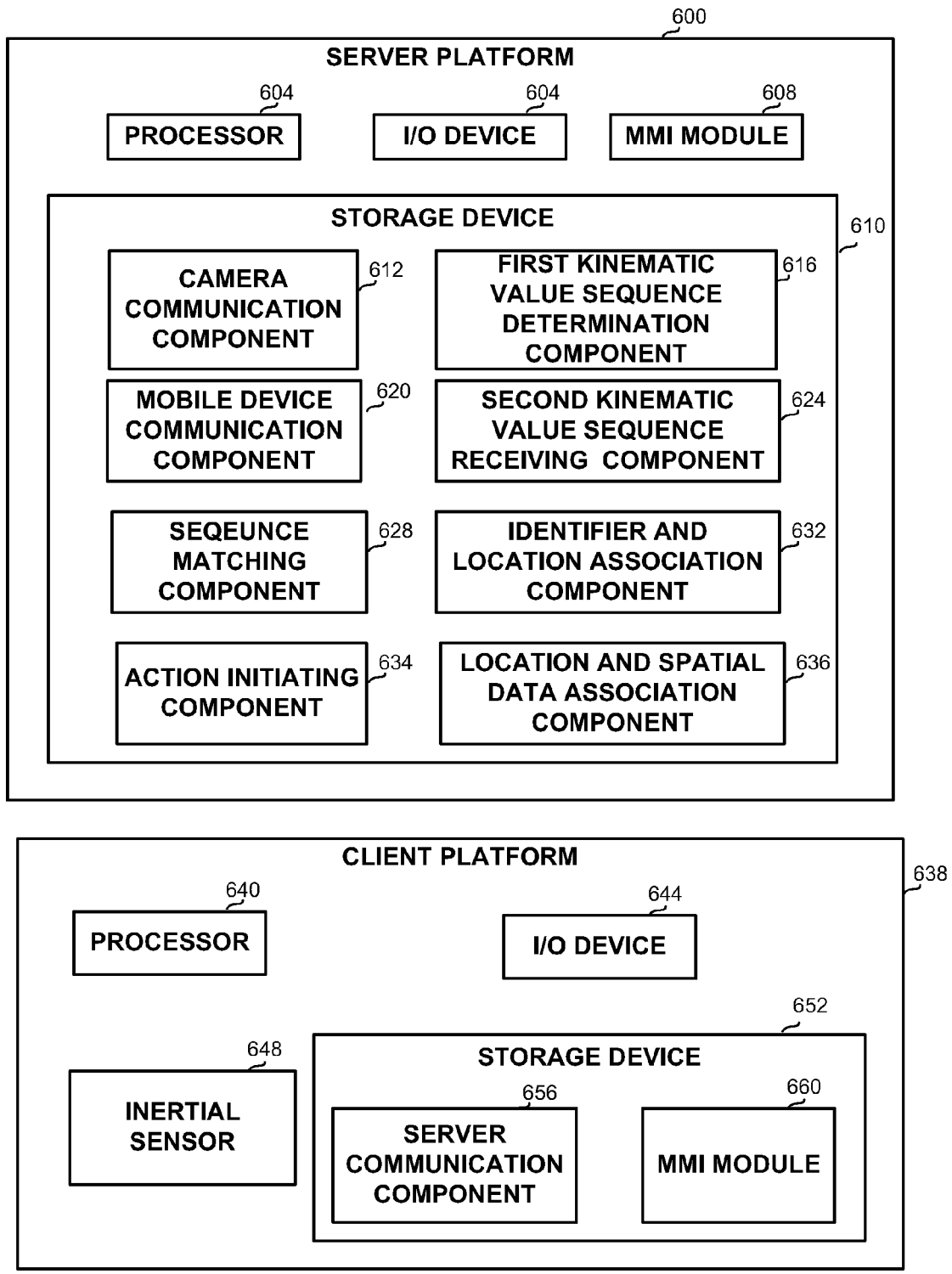
FIG. 6 shows a block diagram of an apparatus for determining and using indoor tracking, in accordance with some exemplary embodiments of the disclosed subject matter.

Referring now to FIG. 6, showing a block diagram of an apparatus for determining and using indoor tracking, in accordance with some exemplary embodiments of the disclosed subject matter.

The apparatus may include a server platform which communicates with mobile devices to match the mobile device and the location, and perform actions related to the mobile device or to a user of a mobile device.

In some exemplary embodiments, server 600 may comprise a processor 604. Processor 604 may be a Central Processing Unit (CPU), a microprocessor, an electronic circuit, an Integrated Circuit (IC) or the like. Alternatively, processor 604 can be implemented as firmware programmed for or ported to a specific processor such as digital signal processor (DSP) or microcontrollers, or can be implemented as hardware or configurable hardware such as field programmable gate array (FPGA) or application specific integrated circuit (ASIC).

Server 600 may further comprise I/O device 604 such as a display, a keyboard, a touch sensor, a mouse, an audio device, or the like, for a user to interact with the server device, generate events, provide commands, or the like. Server 600 may also comprise a man-machine interface (MMI) module 608 which may be used by a user to provide input to the system or to receive output from the system via any of I/O devices 604. It will be appreciated that MMI module 608 may be stored on or loaded to storage device 610 detailed below, and that in some embodiments server 600 may be implemented without MMI module 608.

In some exemplary embodiments, server 600 may comprise one or more storage devices such as storage device 610, for storing for example data related to routes or to the landscape of the environment, details related to one or more client devices or users, or the like. Storage device 610 may be persistent or volatile. For example, storage device 610 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like.

Storage device 610 may store or be loaded with camera communication component 612 for sending commands such as start and stop commands to one or more cameras such as video cameras, and receiving images from the camera or from another device associated with the camera.

Storage device 610 may also store first kinematic value sequence determination component 616 for analyzing the received pictures, and tracking one or more images in sequences obtained from one or more cameras. Tracking the images may include identifying the location in the viewport coordinates or in real world coordinates, at one or more points in time. First kinematic value sequence determination component 616 may also be responsible for deriving once or twice the location sequence obtained from tracking the images. The obtained sequence is thus a sequence of kinematic values such as positions, velocities or accelerations.

It will be appreciated that camera communication component 612 and first kinematic value sequence determination component 616 may be stored on a different storage device, and executed by another computing platform, such that storage device 610 may comprise a first kinematic value sequence receiving component.

Storage device 610 may also store mobile device communication component 620 for communicating with one or more mobile devices, for example establishing communication with mobile devices, and receiving inertial sensor readings or spatial data from the mobile devices, reporting a location to the mobile device, or the like.

A further component of storage device 610 may be second kinematic value sequence receiving component 624, for receiving or determining a sequence of accelerations from the readings of the inertial sensors, as received by mobile device communication component 620, and obtaining a sequence of accelerations. The sequence of accelerations may be transformed to a different coordinate system, and may be integrated once or twice. This obtained sequence is thus also a sequence of kinematic values such as accelerations, velocities or positions.

It will be appreciated that mobile device communication component 620 and second kinematic value sequence determination component 624 may also be stored on a different storage device, and executed by another computing platform, such that storage device 510 may comprise a first kinematic value sequence receiving component. It will also be appreciated that camera communication component 612 and first kinematic value sequence determination component 616 may be stored on a different storage device, and executed by another computing platform, such that storage device 510 may comprise a second kinematic value sequence receiving component.

Yet another component of storage device 610 may be sequence matching component 628 for matching pairs of first and second sequences. Matching should be operated on corresponding first and second sequences, such as first and second position sequences, first and second velocity sequences, or first and second acceleration sequences. Matching may be carried out between a multiplicity of first sequences, such as sequences associated with a multiplicity of images recognized in the captured images, and one or more second sequences, such as sequences received from a multiplicity of mobile devices, or derivations thereof. The result of each such matching may be a matching measure, which indicates the degree of similarity between the sequences, or a degree of certainty that the person carrying the mobile device that provided the sequence is the person tracked in the captured pictures.

Storage device 610 may further comprise identifier and location association component 632 for association the mobile device with the location as obtained from the captured pictures.

Storage device 610 may further comprise action initiating component 634 for activating a particular device or performing an action for or in association with the mobile device or a person associated with the mobile device, optionally at or near the determined location.

Storage device 610 may further comprise location and spatial data association component 636 for associating a point or area with one or more sets of spatial data received at a point or area. Location and spatial data association component 636 may also be responsible for receiving spatial data set and retrieving the point or area associated with the closest spatial data set.

Client platform 638 may comprise any computing platform which may be carried by a user in the environment, such as a mobile phone, a smart phone, a tablet computer, a laptop computer, a Personal Digital Assistant, or the like.

Similarly to Server platform 600, client platform 638 may comprise a processor 640, I/O device 644 and storage device 652 as described above in association with processor 604, I/O device 604 and storage device 610.

It will be appreciated that in addition to the components detailed below, client platform 638 may comprise all components relevant for its regular functionality, such as cellular communication system, Wi-Fi communication system, operating system, applications, or the like.

Client platform 638 may also comprise one or more inertial sensors 548 for sensing the inertia in a particular direction, such as north-south, east-west, along an axis of the device, or the like.

Storage device 652 may comprise server communication component 656 for communicating with server platform 600, for example for establishing communication with server platform 600, and providing the readings of inertial sensors 648 to server platform 600 in a predetermined protocol. Server communication component 656 may, in some embodiments, be used to provide location-based information to the user of the device. However, such information may be passed using any other mechanism or application. The information may also be passed from a system other than server platform 600.

Storage device 652 may also comprise an MMI module 660 for receiving input from a user or providing output to the user, for example instructing the user on how to establish communication between the device and the server.

The disclosed method and apparatus provide for determining the location of a person with enhanced accuracy, and associating the location with a device, for example in order to provide location-based data to a user of the device. The location may be indoor or outdoor location. The method and apparatus may utilize locations tracked from of images in series of pictures captured from one or more capturing devices, and data related to inertia, as sensed by inertial sensors of mobile devices carried by users. The data from the mobile devices may be associated with an identifier of a user of the device. By matching the two data sequences, the exact location may be associated with a person, such that the person may receive location-based data. The matched sequences may comprise locations, velocities, or accelerations, or combinations thereof. For example, if matching locations does not provide conclusive identification, the velocities obtained from the tracked locations and the inertial sensors may be matched. The method and apparatus may match the location sequence with a multiplicity of sequences obtained from inertial sensors associated with a multiplicity of devices. An identifier associated with the sequence providing the highest matching may be associated with the locations. In alternative embodiments, multiple location sequences may be matched to a multiplicity of inertial sequences, such that the match that provides the total best results are used.

It will be appreciated that calculating the inertial route or the matching algorithms may take into account additional data, such as location information of the environment. For example, in a supermarket locations obtained from the inertial routes may be limited to aisles by eliminating locations which are known to contain shelves. Calculating the inertial route or the matching algorithms may also utilize additional data sources such as data obtained through combining GPS data, or the like. In some embodiments, the data may also be combined with data received from a motion sensitive device such as a pedometer, which can indicate for example stepping, stopping or other data related to the dynamics of the movement.

It will also be appreciated that matching between inertial and camera routes may be performed in a many-to-many fashion, wherein multiple camera routes are matched against multiple inertial routes, for example by a server. In other embodiments, a mobile device carries by a user may receive a collection comprising one or more camera routes such that the mobile device does the matching and selects the camera route that best matches a route deduced from its inertial sensor readings.

The disclosed method and apparatus provides for determining the exact location of images, and assuming the images are holding smart devices, the images may be associated with the devices. The matching uses the assumption that the routes of different people will eventually deviate from each other. Kinematic measurements are taken by the devices as well as by a camera, wherein the parameters are synchronized since they measure the same route. Thus, excluding noises the sequences may be synchronized and may be matched. Matching may use correlations or Least Squares techniques (LP norms) between sequences of any kinematic parameters, such as acceleration, velocity, location, or other characteristics such as stopping, turning, or the like.

It will be appreciated that the disclosed method and apparatus may also be used in combination with other methods to enhance robustness.

In some embodiments, the image may be identified with the mobile device. Once identification is achieved, the image may be tracked using the camera only. If and when correspondence between the image and the identified mobile device is lost, the matching may be repeated. The repeated matching may be easier since the general location of the image is already known. In the time period until the new matching is obtained, additional methods may be used, such as INS or Wi-Fi trilateration.

In some embodiments, once matching is achieved, characteristics associated with locations may be stored and used for future localization, when no camera or matching is available. For example the characteristics of a multiplicity of locations may be stored, and later compared to characteristics reported by a device to determine the device location.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), a wired network, a wireless network, a combination thereof, or the like.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by a computerized device, comprising:
    receiving a first sequence of kinematic values related to a route of an image appearing in captured pictures, the first sequence of kinematic values comprising acceleration indications, obtained by deriving twice the route of the image;
    receiving a second sequence of kinematic values related to a series of readings from at least one inertial sensor received from a mobile device, the second sequence of kinematic values comprising acceleration indications;
    determining a matching measure between the first sequence of kinematic values and the second sequence of kinematic values; and
    associating an identifier associated with the mobile device with a location determined from the captured pictures.

2. The computer-implemented method of claim 1, wherein the first sequence of kinematic values and the second sequence of kinematic values comprise location indications.

3. The computer-implemented method of claim 2, further comprising integrating twice the series of readings from the at least one inertial sensor.

4. The computer-implemented method of claim 1, wherein the first sequence of kinematic values and the second sequence of kinematic values comprise velocity indications.

5. The computer-implemented method of claim 4, further comprising integrating the series of readings from the at least one inertial sensor and deriving the route of the image appearing in captured pictures.

6. The computer-implemented method of claim 1, further comprising taking an action related to a user and to the location determined from the captured pictures.

7. The computer-implemented method of claim 1, further comprising:
    determining a multiplicity of matching measures between at least one first sequence of kinematic values and at least two second sequences of kinematic values; and
    associating an identifier associated with the mobile device which provided a second sequence having best match with the at least one first sequence.

8. The computer-implemented method of claim 1, further comprising:
    receiving a series of captures from one or more capturing devices; and
    determining the first sequence of kinematic values based on an image appearing in the captures.

9. The computer-implemented method of claim 1, further comprising starting communication between the computerized device and the mobile device.

10. The computer-implemented method of claim 1, further comprising:
    receiving a sequence of inertial values from the mobile device; and
    determining the second sequence of kinematic values from the sequence of inertial values.

11. The computer-implemented method of claim 1, wherein at least one value associated with the second sequence is set to a kinematic value obtained from the captured pictures.

12. The computer-implemented method of claim 11 wherein the at least one kinematic value is velocity obtained from the captured pictures.

13. The computer-implemented method of claim 11 wherein the at least one kinematic value is a starting location of a route obtained from the captured pictures.

14. A computer-implemented method performed by a computerized device, comprising:
    receiving spatial data from a mobile device;
    receiving a mapping between locations and earlier collected spatial data; and
    based on the spatial data and on mapping between locations and earlier spatial data, associating the spatial data with a location,
    wherein the mapping is created using a combination of a first sequence of kinematic values related to a route of an image appearing in captured pictures and comprising acceleration indications obtained by deriving twice the route of the image, and a second sequence of kinematic values related to a series of readings of at least inertial sensor received from a mobile device and comprising acceleration indications.

15. An apparatus having a processing unit and a storage device, the apparatus comprising a server platform, the apparatus comprising:
    a first kinematic value sequence receiving for receiving a first sequence of kinematic values related to a route of an image appearing in captured pictures, the first sequence of kinematic values comprising acceleration indications, obtained by deriving twice the route of the image;
    a second kinematic value sequence receiving for receiving a second sequence of kinematic values related to a series of readings from at least one inertial sensor received from a mobile device carried by a user, the second sequence of kinematic values comprising acceleration indications;
    a sequence matching component for determining a matching measure between the first sequence of kinematic values and the second sequence of kinematic values; and
    an identifier and location association component for association the mobile device with a location obtained from the captured pictures.

16. The apparatus of claim 15, wherein the first sequence of kinematic values and the second sequence of kinematic values comprise location indications, and wherein the series of readings from the at least one inertial sensor is integrated twice.

17. The apparatus of claim 15, wherein the first sequence of kinematic values and the second sequence of kinematic values comprise velocity indications and wherein the series of readings from the at least one inertial sensor is integrated, and the route of the image appearing in captured pictures is derived.

18. The apparatus of claim 15, further comprising an action initiating component for taking an action related to a user and to the location determined from the captured pictures.

19. The apparatus of claim 15, wherein the sequence matching component is adapted to determine a multiplicity of matching measures between at least one first sequence of kinematic values and at least two second sequences of kinematic values; and to associate the mobile device which provided a second sequence having best match with the at least one first sequence.

20. The apparatus of claim 15, further comprising:
   a camera communication component for receiving the series of captures from one or more capturing devices; and
   a first kinematic value sequence determination component for determining the first kinematic value sequence based on an image appearing in the captures.

21. The apparatus of claim 15, further comprising a mobile device communication component establishing communication between the server platform and the mobile device.

22. The apparatus of claim 15, further comprising a second kinematic value sequence receiving component for determining the second sequence of kinematic values from the sequence of inertial values.

23. The apparatus of claim 15, wherein the sequence matching component is executed by the mobile device.

24. The apparatus of claim 15, further comprising a location and spatial data association component for associating a point or area with spatial data received at the point or area and for receiving spatial data set and retrieving a point or area associated with a stored spatial data set being closes to the spatial data set.

25. A computer program product comprising:
   a non-transitory computer readable medium;
   a first program instruction for receiving a first sequence of kinematic values related to a route of an image appearing in captured pictures, the first sequence of kinematic values comprising acceleration indications, obtained by deriving twice the route of the image;
   a second program instruction for receiving a second sequence of kinematic values related to a series of readings from at least one inertial sensor received from a mobile device, the second sequence of kinematic values comprising acceleration indications; and
   a third program instruction for determining a matching measure between the first sequence of kinematic values and the second sequence of kinematic values; and
   a fourth program instruction for associating an identifier of the mobile device with a location determined from the captured pictures,
   wherein said first, second, third and fourth program instructions are stored on said non-transitory computer readable medium.

26. A computer-implemented method performed by a computerized device, comprising:
   receiving a first sequence of kinematic values related to a route of an image appearing in captured pictures;
   receiving a second sequence of kinematic values related to a series of readings from at least one inertial sensor received from a mobile device;
   determining a matching measure between the first sequence of kinematic values and the second sequence of kinematic values;
   associating an identifier associated with the mobile device with a location determined from the captured pictures;
   determining a multiplicity of matching measures between at least one first sequence of kinematic values and at least two second sequences of kinematic values; and
   associating an identifier associated with the mobile device which provided a second sequence having best match with the at least one first sequence.

27. An apparatus having a processing unit and a storage device, the apparatus comprising a server platform, the apparatus comprising:
   a first kinematic value sequence receiving for receiving a first sequence of kinematic values related to a route of an image appearing in captured pictures;
   a second kinematic value sequence receiving for receiving a second sequence of kinematic values related to a series of readings from at least one inertial sensor received from a mobile device carried by a user,
   a sequence matching component for determining a matching measure between the first sequence of kinematic values and the second sequence of kinematic values; and
   an identifier and location association component for association the mobile device with a location obtained from the captured pictures,
   wherein the sequence matching component is adapted to determine a multiplicity of matching measures between at least one first sequence of kinematic values and at least two second sequences of kinematic values; and to associate the mobile device which provided a second sequence having best match with the at least one first sequence.

* * * * *